United States Patent [19]

Seyler

[11] Patent Number: 4,889,327
[45] Date of Patent: Dec. 26, 1989

[54] MULTIPLE-STRAND TORSION SPRING

[75] Inventor: Peter G. Seyler, Franklin Park, Ill.

[73] Assignee: Perfection Spring & Stamping Corp., Mt. Prospect, Ill.

[21] Appl. No.: 274,336

[22] Filed: Nov. 21, 1988

Related U.S. Application Data

[62] Division of Ser. No. 168,377, Mar. 15, 1988, Pat. No. 4,821,390.

[51] Int. Cl.$^4$ ............................................. F16F 1/06
[52] U.S. Cl. .................................... 267/168; 267/180; 267/289; 267/290
[58] Field of Search ............... 267/4, 166, 166.1, 167, 267/168, 180, 289, 290; 29/173, 411, 417, 445, 456; 228/173

[56] References Cited

U.S. PATENT DOCUMENTS 3,905,403  9/1975  Smith et al. ..................... 267/168 X

FOREIGN PATENT DOCUMENTS 3531200  5/1986  Fed. Rep. of Germany ...... 267/168
857405  4/1940  France ............................... 267/168

Primary Examiner—Timothy V. Eley
Attorney, Agent, or Firm—Tilton, Fallon, Lungmus

[57] ABSTRACT

A helical spring composed of a plurality of parallel, coiled strands of spring wire with such strands being unconnected along most of their length but being joined together at least at one end of the spring. In a preferred embodiment, such strands or wires are welded together at opposite ends of the spring. Such a spring is formed by incrementally advancing a plurality of wires in contiguous, parallel relation towards a wire-coiling station and then, at the termination of a coiling step, interrupting such advancement to sever the wires through, or immediately adjacent to, a first welded zone while at the same time welding such wires together in a second zone spaced a precise distance from the point of the severing operation.

2 Claims, 2 Drawing Sheets

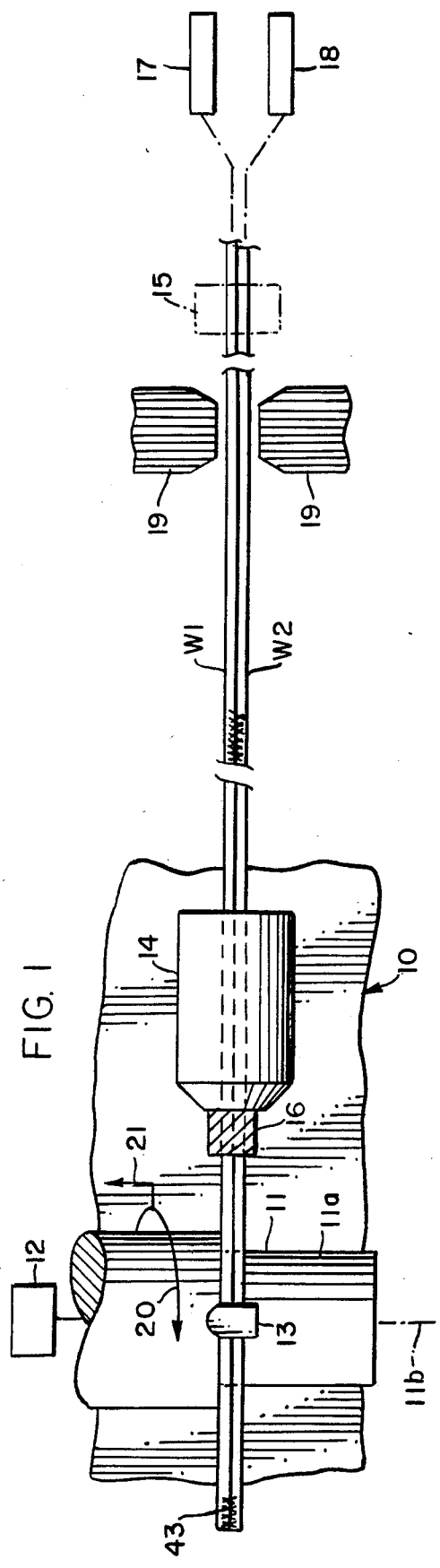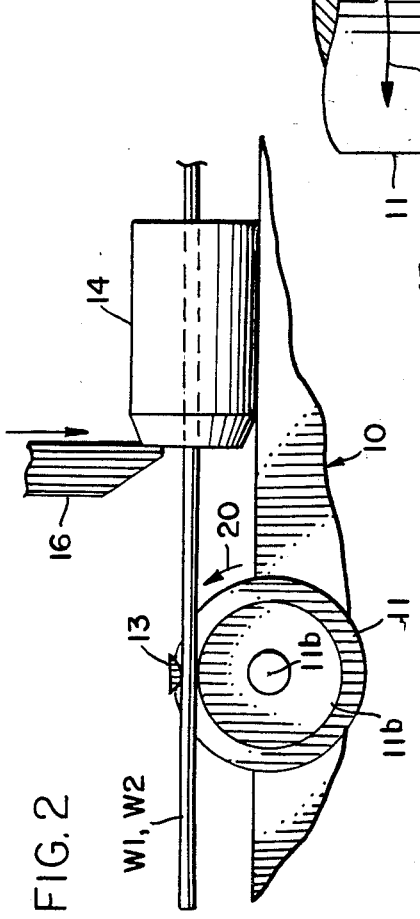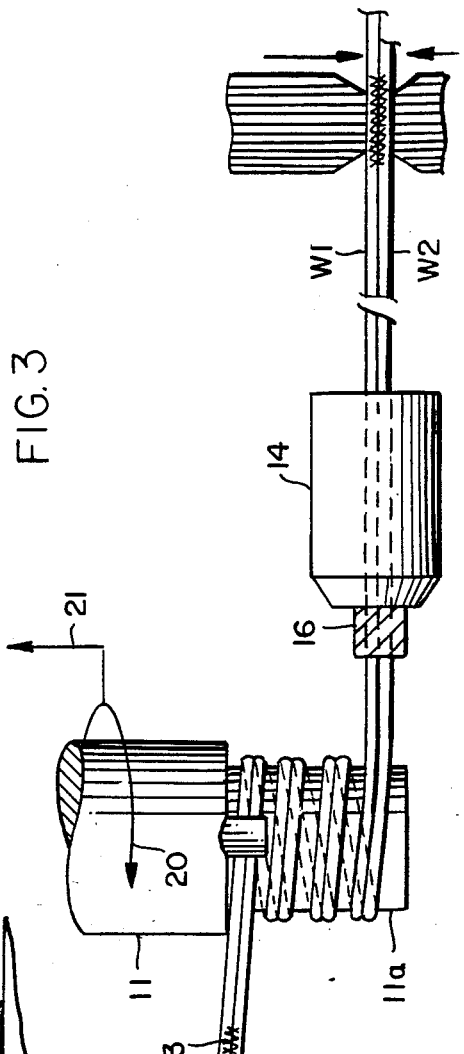

MULTIPLE-STRAND TORSION SPRING

This application is a division, of application Ser. No. 168,377, filed Mar. 15, 1988 Pat. No. 4,821,390.

BACKGROUND AND SUMMARY

Multiple-strand helical springs have been known in the past and are believed particularly useful in torsion spring applications, such as in providing a return force for the throttle shaft of an automotive vehicle, because of their safety advantages. Should breakage occur in only one strand of wire of such a spring, the return force would be reduced but the spring would not usually become disabled or inoperative.

Such a spring, to be effective, should have the multiple wires that form its coiled portion unconnected to each other, so that each coiled wire of the spring is capable of functioning independently. However, all of the wires at least at one end of the spring should be permanently secured together.

It has been previously known to provide a double-wire torsion spring construction in which the two wires are integral portions of a single length of wire that, at the commencement of a manufacturing operation, is first folded upon itself at its midpoint to form a pair of parallel strands. The folded end is then fed into a torsion winding machine where the double strands are simultaneously coiled in a manner similar to that commonly used in connection with the forming of single-wire helical torsion springs.

It is believed evident that such a construction would be time-consuming and expensive to manufacture. For each spring so manufactured on a one-at-a-time basis, a double length of wire must first be cut from stock and then folded upon itself. After flattening the fold to reduce it in thickness or width, the folded end must then be fed into the torsion spring winding machine. Continuous operation is not possible because each piece of wire must be separately cut and folded before a winding step is commenced. In addition to these manufacturing complexities, a double-wire torsion spring of folded-wire construction has the disadvantages of inherent weakness and risk of fracture at the point of the fold. Furthermore, should permanent attachment of the wires at the opposite end of the spring be desired (especially in view of such weaknesses at the folded end of the spring), a separate, subsequent welding step would be necessary.

Accordingly, an important object of this invention lies in providing a highly efficient and effective method for making multiple-strand helical springs in which the strands are joined together at least at one end, and preferably at both ends, of the spring. No folding of wire is involved and, if desired, the spring may be formed of more than two strands similarly joined together at opposite ends of the spring but always with the strands of the coiled portions free to move or slide (to a limited extent) in relation to each other. The wire is cut only after each helical spring has been wound using a standard torsion machine. In a preferred embodiment of the method, such cutting or severing occurs simultaneously with a welding step performed at a measured distance (which constitutes the developed length of a spring) from the cutting point so that, during a successive cycle of operation, the parallel strands of wire will be advanced and the next cutting operation will occur at (or immediately adjacent to) the welded zone produced during the preceding cycle. Ideally, the cut is made through the welded zone so that the strands on opposite sides of the cut remain welded together; however, as brought out hereinafter, the cut may alternatively be made immediately in advance of the welded zone so that each spring, in its final form, has its strands joined together only at one end of that spring.

Briefly, the method of this invention involves the steps of arranging a plurality of wires in substantially parallel, contiguous relation. The wire may be unwound from separate supply spools and guided in a straight path towards the mandrel of a torsion coiling machine. Along that path, each wire may be considered to have integral first, second, and third sections of equal length with the first sections of the parallel wires having their leading end portions welded together in a first zone of permanent connection. Such wires are also welded together in a second zone of connection spaced from the first zone and located along a defined stretch of wire that includes the trailing end portions of the first sections and the leading end portions of the second sections. As the parallel wires are advanced, the first sections are progressively wound about the mandrel of the torsion machine. The coiling operation is momentarily interrupted when a selected number of coils have been formed and, during such interruption, all of the wires are transversely severed at a point along the defined stretch and are welded together, preferably simultaneously with the severing step, at a third zone of connection located behind the second zone at a distance equal to the distance between the first and second zones or a multiple thereof.

In a preferred embodiment, the severing step involves severing the wires at a point within the longitudinal limits of the second zone of connection so that, following that severing step, the trailing end portions of the wires of the first sections remain connected to each other and the leading end portions of the wires of the second sections also remain connected to each other. A single welding step therefore functions in permanently connecting the ends of the wires for each of two successively-wound torsion springs. Alternatively, the severing may occur at a point ahead of the second zone of connection so that the trailing end portions of the wires of the first sections become disconnected from each other while the leading end portions of the wires of the second sections remain permanently connected by the weld. In any case, the steps of arranging, winding, severing, and welding are continued in repeated cycles of operation with a completed coil spring being formed and released during each cycle of the progressive manufacturing procedure.

The result of such a method is a helical torsion spring having two or more spring wires disposed in parallel, contiguous relation and arranged in a helix composed of a series of coaxial coils. The wires are unconnected and capable of limited independent movement along nearly the full length of the spring but all of the wires are permanently joined by welding at least at one end of the spring. In a preferred form of the invention, the opposite ends of the spring have all of the wires welded together at those points.

Other features, advantages, and objects of the invention will become apparent from the specification

DRAWINGS

FIG. 1 is a somewhat schematic side elevational view depicting an apparatus for performing the method of this invention.

FIG. 2 is a bottom view of the apparatus of FIG. 1.

FIG. 3 is an elevational view similar to FIG. 1 but illustrating the apparatus in a later stage of operation.

DETAILED DESCRIPTION OF PREFERRED EMBODIMENTS

Figure 5:
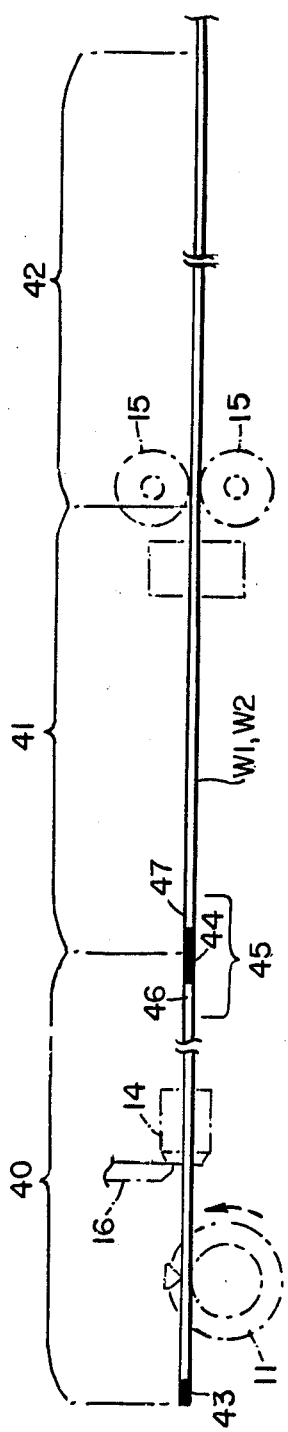
FIG. 5 is a schematic view showing a first stage in the method.

Referring to FIGS. 1–3 of the drawings, the numeral 10 generally designates a spring-winding machine or, as it is commonly called, a torsion machine, for winding coil springs from wire stock. Such machines are well known in the industry and, except for certain distinctive features described below, the apparatus depicted in the drawings is conventional. Characteristically, such a machine includes a rotatable mandrel or spindle 11 intermittently driven by an electric motor or other suitable power means 12. A catch pin or lug 13 is mounted on the spindle and is spaced from the spindle's reduced neck portion 11a so that the end of spring wire stock may be temporarily entrapped between the pin and the neck of the spindle. An apertured quill or guide member 14 is mounted on the frame of the machine and directs the wire stock towards the mandrel. A feed mechanism, which may take the form of a pair of feed rollers 15 (FIG. 5), feeds the wire stock through the quill and towards the rotatable mandrel. A reciprocable cutter blade 16 slides against the face of quill 14 across its opening to shear or sever the wire stock at the completion of each winding cycle. It is to be understood that other types of cutting means might be utilized to perform the same function and that all of the structure so far described is typically found in a conventional spring-winding machine.

Unlike conventional equipment, however, machine 10 is capable of processing two or more wires W1 and W2 simultaneously. Only two such wires are shown in the drawings, but it is to be understood that a greater number may be provided. The wire stock extends from supply means 17 and 18 which may take the form of large supply rolls or spools of wire. The feed means 15 directs the plural wires in straight, parallel, contiguous relation through the guide passage or aperture of quill 14 towards winding mandrel or spindle 11. A welding station including a pair of welding electrodes 19 is disposed between the supply rolls and the quill and, when activated, such electrodes spot weld portions of wires W1 and W2 together.

It will be observed that the wires are arranged so that they are equidistant from the rotational axis 11b of spindle 11. While in most cases the wires would be of circular cross section, there is no requirement that that be the case. For example, such wires may be of rectangular, oval, or polygonal section as long as the cross sectional configuration of each wire is uniform throughout its length. Also, while spring steel would be their normal composition, such wires may be formed of other suitable materials having similar properties.

In the operation of the apparatus, wires W1 and W2 are advanced through quill 14 with blade 16 in its retracted condition and with the non-rotating spindle precisely oriented so that the leading ends of the wires pass between catch pin 13 and the spindle's reduced neck portion 11a. The spindle is then rotated in the direction indicated by arrow 20 and, at the same time, is progressively retracted or raised axially as indicated by arrow 21. The wires are played onto the rotating spindle and, as the spindle retracts axially, are wound upon the reduced portion of the spindle until a predetermined number of coils have been formed (FIG. 3). The relationship between the rotational and axial speeds of the spindle or mandrel may be controlled so that the pitch of the spring coils may be varied to meet manufacturing requirements. Thus, by controlling the rate of axial retraction of the spindle in relation to its rotational speed, successive coils of the spring may be formed on the spindle in contact with each other or, alternatively, may be spaced apart any selected distance. As soon as forward rotation of the spindle has ceased, rotation is momentarily reversed to accommodate slight springing-back of the spring and blade 16 then extends to shear wires W1 and W2 and the formed helical spring is automatically released from the reduced end portion 11a of the mandrel. The spindle then descends to its original position and the process is repeated.

Figure 4:
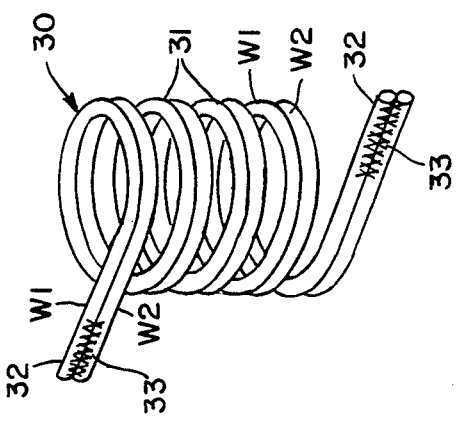
FIG. 4 is a perspective view of a coil spring formed by the method of this invention.

In the method of this invention, the advancing, winding, and cutting steps are synchronized with a welding step so that the lengths of the plural wires that form each finished spring have their ends permanently connected together at one end, and preferably at both ends, of the spring. A preferred construction is depicted in FIG. 4 where it will be seen that spring 30 has a plurality of coaxial coils 31 which terminate at opposite ends of the spring in a pair of end portions 32 that have their plural strands or wires W1 and W2 welded together at 33. Throughout the remainder of the spring, wires W1 and W2 are unconnected and are therefore capable of limited independent displacement or flexure. For use as a torsion spring, spring 30 should have its end portions 32 projecting tangentially away from the cylindrical body of the coil spring as clearly indicated in FIG. 4.

Figure 6:
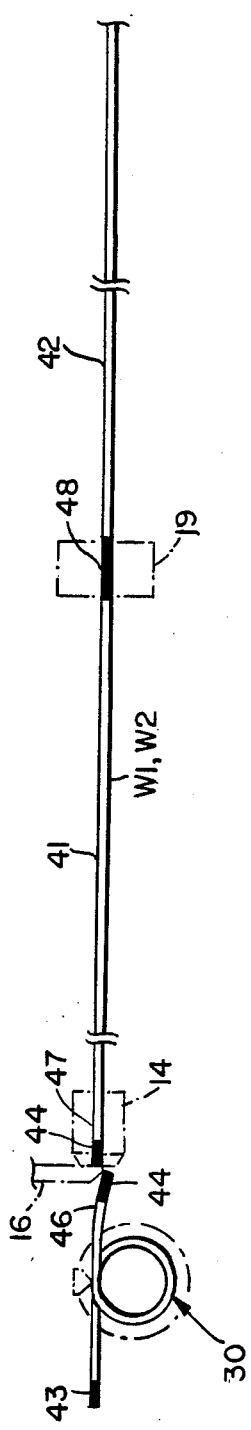
FIG. 6 illustrates a second stage or cycle in such method.

The method by which the spring 30 is formed, and the inclusion of the welding step as part of that method, are schematically revealed in FIGS. 5 and 6. Referring to FIG. 5, the parallel wires W1, W2 may be considered as being composed of three undivided sections 40, 41 and 42 of equal length. The length of each such section is the length of each of a plurality of wires W1, W2 required to form a completed spring 30. In the initial operating stage indicated in FIG. 5, wires W1, W2 are straight and the leading end portions of the wires that constitute the first section 40 are welded together in a first zone of connection represented by numeral 43.

Wires W1 and W2 are also welded together in a second zone of connection 44 that is spaced from the first zone 43 and is located along a stretch of wire 45 that includes the trailing end portions 46 of the wires W1, W2 of the first section and the leading end portions 47 of the wires of the second section. The parallel, contiguous, and substantially straight wires W1, W2 are advanced together through quill 14 as spindle 11 begins to rotate. As already described, such rotation winds the parallel wires of the first section 40 about the neck of the spindle until a predetermined number of coils have been formed, at which time the winding operation is stopped, then momentarily reversed to accommodate springing-back of the spring, and blade 16 extends to sever the wires along the defined stretch 45 (FIG. 6). In the preferred embodiment, the transverse severing occurs directly through the welded zone 44 with the result that spring 30 has its wires welded together at opposite ends 43 and 46 and, further, that the leading ends of the wires of the incrementally-advanced second section 41 are also secured together by a portion of the same weld 44.

At the same time that the advancement of the wires W1, W2 is interrupted for the severing step, welding means 19 is activated to permanently secure the wires together in a third zone of connection 48 (FIG. 6). The spacing between welded zones 47 and 48 is the same as the original linear distance between welded zones 43 and 44—that is, the developed length of the wires from which a given spring is to be formed. It is to be understood, however, that to achieve such a result the welding station 19 need not be spaced from cutter 16 the same distance as the length of each of the sections 40, 41, or 42 but may be spaced from that cutter a distance equal to a multiple of such length. In either case, a similar result will be obtained.

Figure 6A:
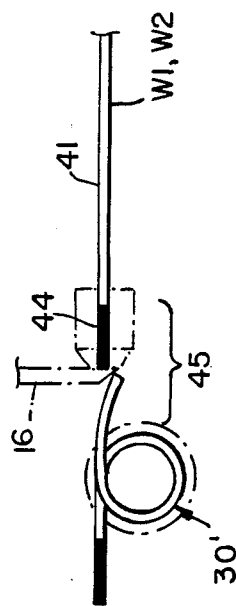
FIG. 6A is a fragmentary view similar to FIG. 6 but depicting a variation of the manufacturing method.

In certain instances, it may be desirable to provide a spring similar to coil spring 30 but with the wires thereof joined together by welding at only one end of the spring. Such a spring 30' may be readily formed by simply severing the wires along stretch 45 at a point immediately in front of the zone of welded connection 44 (FIG. 6A).

It is also to be understood that if cutting through a weld is considered undesirable for any reason, each welded zone 44, 48 may instead be formed as a pair of closely spaced welded portions with the transverse cut by blade 16 extending between the pair of such portions of each weld.

While in the foregoing, embodiments of the invention have been disclosed in considerable detail for purposes of illustration, it will be understood by those skilled in the art that many of these details may be varied without departing from the spirit and scope of the invention.

I claim:

1. A helical torsion spring comprising a plurality of spring wires disposed in parallel, contiguous relation and arranged in a helix composed of a series of coaxial coils; said wires being unconnected and free for limited movement relative to each other along a major portion of the length of said coils; each of said wires including a pair of end portions at opposite ends of said helix; said end portions of all of said wires at both ends of said helix being welded together.

2. The spring of claim 1 in which said end portions of said wires at each end of said helix are straight and project tangentially from said helix.

* * * * *

REEXAMINATION CERTIFICATE (2441st)
United States Patent [19]
Seyler

[11] B1 4,889,327
[45] Certificate Issued  Dec. 20, 1994

[54] MULTIPLE-STRAND TORSION SPRING

[75] Inventor: Peter G. Seyler, Franklin Park, Ill.

[73] Assignee: Harris Trust and Savings Bank, Chicago, Ill.

Reexamination Request:
No. 90/003,392, Apr. 7, 1994

Reexamination Certificate for:
Patent No.: 4,889,327
Issued: Dec. 26, 1989
Appl. No.: 274,336
Filed: Nov. 21, 1988

Related U.S. Application Data

[62] Division of Ser. No. 168,377, Mar. 15, 1988, Pat. No. 4,821,390.

[51] Int. Cl.$^5$ .................................... F16F 1/06
[52] U.S. Cl. .................... 267/168; 267/180; 267/289; 267/290
[58] Field of Search ............... 267/4, 166, 166.1, 167, 267/168, 180, 289, 290; 29/173, 411, 417, 445, 456; 228/173

[56] References Cited

U.S. PATENT DOCUMENTS 2,668,615  2/1954  Sampatacos ................. 203/230
4,582,653  4/1986  Blanchard et al. ............. 261/65

FOREIGN PATENT DOCUMENTS 937924  1/1956  Germany.
27542  of 1911  United Kingdom.

*Primary Examiner*—Timothy V. Eley

[57] ABSTRACT

A helical spring composed of a plurality of parallel, coiled strands of spring wire with such strands being unconnected along most of their length but being joined together at least at one end of the spring. In a preferred embodiment, such strands or wires are welded together at opposite ends of the spring. Such a spring is formed by incrementally advancing a plurality of wires in contiguous, parallel relation towards a wire-coiling station and then, at the termination of a coiling step, interrupting such advancement to sever the wires through, or immediately adjacent to, a first welded zone while at the same time welding such wires together in a second zone spaced a precise distance from the point of the severing operation.

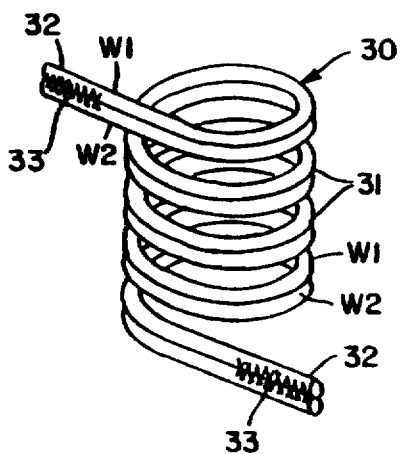

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *